Aug. 13, 1963      W. POSNER      3,100,418

OPTICAL APPARATUS FOR PRODUCING CHANGING DESIGNS

Filed April 20, 1959      3 Sheets-Sheet 1

INVENTOR
WOOLF POSNER.
BY
Lockwood, Woodard, Smith & Weikart
ATTORNEYS.

Aug. 13, 1963 W. POSNER 3,100,418
OPTICAL APPARATUS FOR PRODUCING CHANGING DESIGNS
Filed April 20, 1959 3 Sheets-Sheet 2

INVENTOR
WOOLF POSNER
By Lockwood, Woodard, Smith & Weikart
ATTORNEYS.

Aug. 13, 1963 W. POSNER 3,100,418
OPTICAL APPARATUS FOR PRODUCING CHANGING DESIGNS
Filed April 20, 1959 3 Sheets-Sheet 3

INVENTOR
WOOLF POSNER.
BY
Lockwood, Woodard, Smith + Weikart.
ATTORNEYS.

United States Patent Office 3,100,418
Patented Aug. 13, 1963

3,100,418
OPTICAL APPARATUS FOR PRODUCING CHANGING DESIGNS
Woolf Posner, 27 Buckingham Palace Mansions, Buckingham Palace Road, London SW. 1, England
Filed Apr. 20, 1959, Ser. No. 807,397
4 Claims. (Cl. 88—15)

This invention relates to the provision of optical apparatus for producing rhythmic designs for example for use in industry. The rhythmic designs produced by my new optical apparatus may be in colour and may be used as designs for use on wallpaper or fabrics or for other industrial applications. The optical apparatus may also be used for entertainment purposes, as an aid to decor, and in many other ways.

It is well known that very beautiful patterns can be produced mechanically by means of a kaleidoscope but this instrument is subject to the limitation that it can only be used to produce patterns formed by a symmetrical arrangement of identical juxtaposed image segments each composed of an arrangement of basic elements with sharp lines of demarcation between adjacent elements. Moreover the method of changing the pattern is entirely random in action and does not provide for any control of colour or constructional pattern. Basically therefore the patterns produced by a kaleidoscope are founded on a random arrangement of juxtaposed coloured elements which produce an image, the whole pattern being formed by reproducing a single segment several times around a centre so that a simple mechanical symmetry is obtained in the finished pattern when the single segment is compounded into a repeat pattern by reflection.

According to the present invention I provide an optical apparatus for producing rhythmic designs comprising an adjustable pattern producing cell including light sensitive filters through which light rays may be passed and adapted to produce an endless succession of different patterns as the cell is adjusted and a multi-vision lens through which the rays from the cell may be passed and adapted to convert the juxtaposed patterns into partly superimposed rhythmic designs having a complex symmetry, or even an unsymmetrical arrangement may be produced. The multi-vision lens in a preferred embodiment of the invention has an irregular surface, that is to say the surface may have a multiplicity of projections or facets to produce the desired result.

In more detail I may provdide an optical apparatus for producing rhythmic designs comprising a body adapted to form a direct or indirect path for light rays from an inlet end to an outlet end, an adjustable pattern producing cell including light filters at or near to the inlet end of the body and a multi-vision lens having an irregular surface such as a faceted or like lens at or near to the outlet end of the body whereby partly superimposed rhythmic designs having a complex symmetry, or even an unsymmetrical arrangement may be produced.

The body may be in the form of a hollow encasement tube of uniform circular cross-section having suitably arranged mirrors disposed within the encasement tube to form a light passage in the manner of a kaleidoscope. The mirrors may extend the whole way down the tube or only part of the way. A light passage of any suitable cross-section may be used and if desired the cross-section of the light passage formed in the encasement tube of the instrument may vary. For example the surface of the mirrors may be irregular or plain (straight, concave or convex) and I may use a light passage in which the cross-section is changed either from one form to another form abruptly e.g. from square to triangular or regularly simply by decreasing the size of the passage from one end to the other.

In this specification I use the word mirrors generically to include any suitable image reflecting surface.

The pattern-producing cell may be looked upon as a pattern and if desired a colour generator which is capable of acting on the light entering the body for example by polarising, decomposing and analysing the light in such a way as to produce complex patterns. The cell may include movable light filters for varying the colour or opacity of the patterns produced and particularly for producing different colour changes or changes in opacity in different parts of the patterns. The cell may also include loose pieces of suitable material adapted to adopt a random disposition within the cell to assist in producing the various patterns and if desired a colour boost may be provided by adding transparent or translucent self-coloured materials. The light filters may be adjustable angularly of the cell that is to say they may be rotatable through 360° or less or the filters may be removable and replaceable in the manner of slides. Alternatively or in addition one or more of the light filters may be adjustable by tilting.

The multi-vision lens may comprise a lens having a multiplicity of facets to convert the patterns into more acceptable rhythmic designs of a complex structure. A form of lens which has been found to be most effective is one having a plane rear surface and a convex front surface composed of interfitting equilateral triangular facets. The multi-vision lens may be fixed or if desired the multi-vision lens may be adjustable relatively to the tube either in conjunction with a focussing lens or separately. I should like to make it clear that in this specification I am using the word pattern to refer to an image in which the segments making up the pattern are juxtaposed that is to say side by side. In a known kaleidoscope the pattern is a regular or symmetrical one. In contrast to the patterns produced by a kaleidoscope those produced by the pattern producing cell described above and forming a part of the present invention may be irregular or unsymmetrical. The effect of the multi-vision lens on the patterns produced by the cell is to convert the rather uninteresting juxtaposed patterns into more pleasing and useful rhythmic designs in which the segments merge into one another and become partly superimposed. As an example of this, FIGURE 1 illustrates a juxtaposed pattern that may be produced by reflection of the shaded segment A produced by a cell while FIGURE 2 illustrates the finished rhythmic design after the light has passed through a multi-vision lens. Similar effects can be obtained by using instead of a faceted lens, a lens having projections, castellations or other means of partially superimposing the patterns. I may also use a smooth surface lens in combination with an apertured opaque mask, a multiplicity of apertures in the mask having substantially the same effect as the irregular surface on the lens.

My new optical apparatus may be designed to enable complex designs to be produced which are created from a random arrangement of elements and to make it possible to control colours and opacity which appear in the designs. A further improvement resides in the provision of means by which the designs produced can be varied by continuous movements which give the operator a degree of control over the variation of the design. The designs produced by my new optical apparatus may be used for industrial purposes, for entertainment, for display and for many other purposes. In operation the designs may be viewed by looking into the end of the body or they may be projected on to a small screen adjacent to the body in combination with a suitable focussing lens system. Alternatively the designs may be projected on to a relatively large screen for mass viewing.

Another possibility is to project the designs directly on to a photographic film so that a series of exposures may be made of the changing patterns whereby a permanent and reproducible record of the designs is made It is also possible to adapt the apparatus for television purposes so that the designs are transmitted for example in place of an interval signal. It is also possible to record the designs on sensitised or magnetic tape or wire for subsequent visual reproduction. If desired the designs may be doubled with music to produce a new form of visual entertainment represented by the combination of music and ever-changing rhythmic coloured designs. It is considered that this will be particularly valuable when colour television comes into more general use. A motor or motors may be provided by means of which the parts of the cell and if desired the multi-vision lens and/or the mirrors may be continuously adjusted relatively to one another so that the designs produced by the apparatus are changing continually in form, colour and motivated effects.

In order that the invention may be more clearly understood and readily carried into effect, reference is now directed to the accompanying drawings given by way of example and in which.

Figure 1:
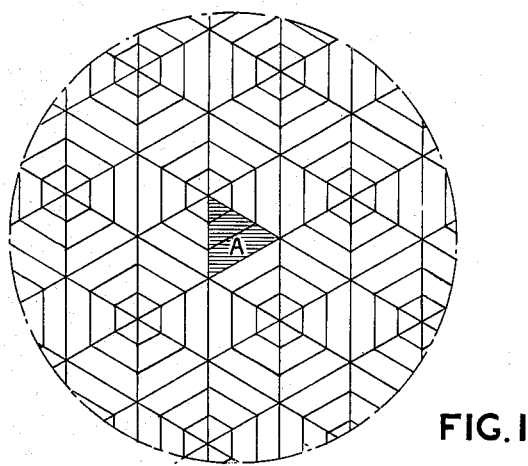
FIGURE 1 illustrates a juxtaposed pattern produced by reflection of the shaded segment by use of the subject invention.
Figure 2:
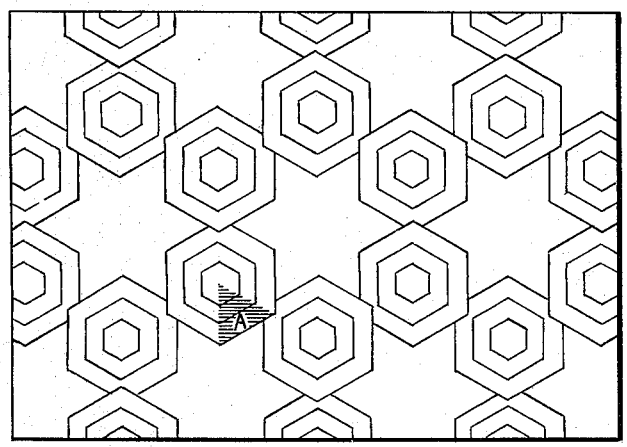
FIGURE 2 illustrates a finished design after light has passed through a multi-vision lens of the invention.
Figure 3:
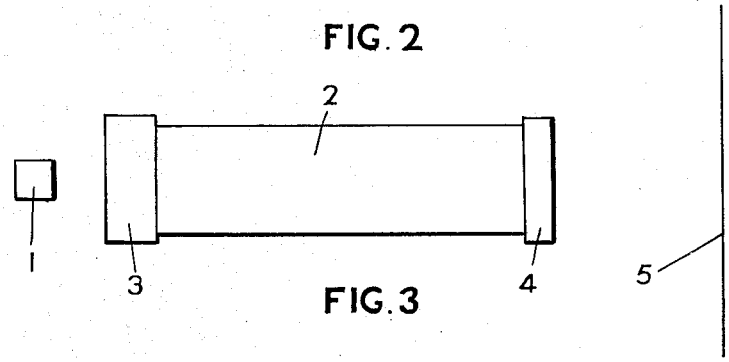
FIGURE 3 is a diagrammatic view of one form of the apparatus embodying the invention.

Referring to FIGURE 3, 1 is a light source, 2 is a reflector tube forming a path for light rays from the light source 1 which are directed into the tube, 3 is a pattern producing cell through which the light rays pass and 4 is a lens assembly including a faceted lens adapted to produce useful designs from the patterns provided by the cell in conjunction with the reflector tube. The lens assembly 4 also includes a focussing lens hereinafter described to direct the designs on to a screen 5.

If the heat of the light source causes any part of the apparatus to overheat, suitable means may be provided for cooling including air circulation over and around the various filters.

Figure 4:
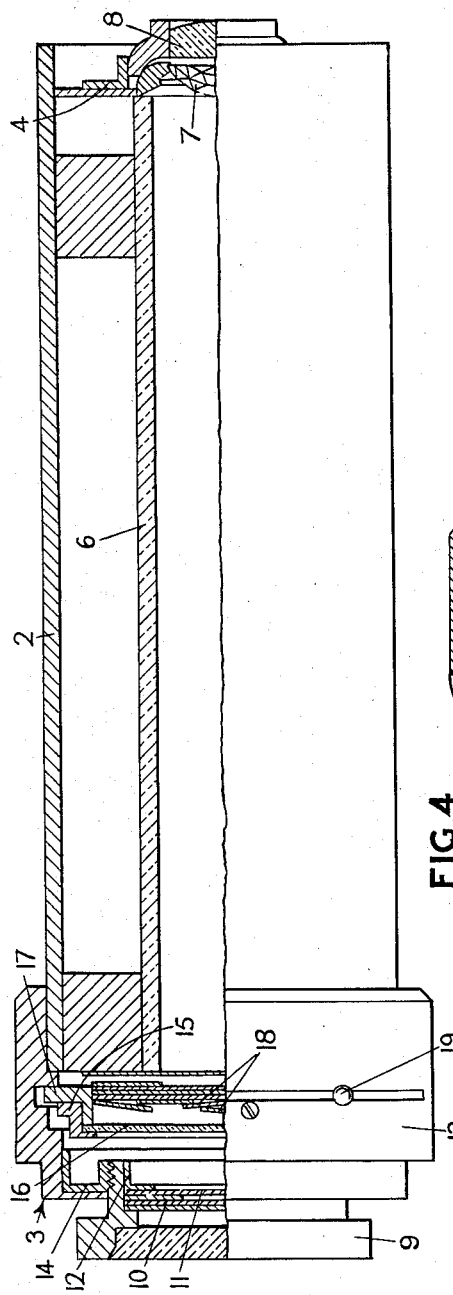
FIGURE 4 is a longitudinal sectional view of one embodiment of the invention.

In FIGURE 4 the tube 2 has a cell unit 3 at one end a lens assembly 4 at the other end. The tube 2 also has, if desired, suitably arranged mirrors indicated at 6 and disposed inside the tube. The cell unit includes filters of light sensitive material e.g. doubly refractive material such as mica and light polarising material between which are disposed a random arrangement of pieces of light polarising and/or refracting material. The function of the cell unit is to act on the light passing through the cell unit into the tube in such a way as to create patterns in conjunction with the mirrors which may be changed by angular displacement or other adjustment of parts of the cell unit relatively to the tube.

The lens unit 4 includes a faceted lens 7 and a focussing lens 8. The function of the faceted lens 7 is to cause the juxtaposed elements of the patterns produced in the cell and the mirrors to become partially superimposed and to merge into one another and so to form beautiful and useful rhythmic designs. The focussing lens 8 directs the designs onto the screen 5 so that they may be viewed easily.

Figure 5:
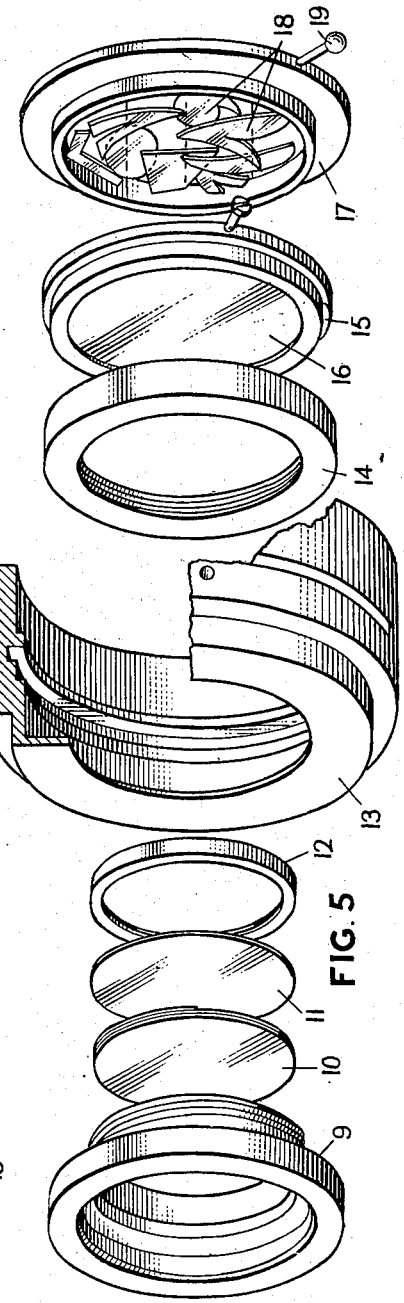
FIGURE 5 is an exploded view of a pattern producing cell.

FIGURE 5 illustrates the cell unit in more detail and in FIGURE 5 reading from left to right we have the following elements:

An outer cap 9 having a translucent heat resisting or absorbing filter, a disc wall 10 of light polarizing material combined with a mica filter in divided thickness, a light diffuser 11 of acid etched glass, a spacing ring 12, a cell body 13, a spacing ring 14, an inner cap 15 embodying a disc of mica 16, an inner end member 17 which carries an analyzer disc or wall 17' of polarizing material for example material known under the registered trademark "Polaroid" combined with material known under the registered trademark "Cellotape" in divided thickness and pieces 18 of polarizing material disposed between the disc 16 and the analyzer disc or wall 17'. The inner end member has a projection 19 by means of which the pieces 18 may be adjusted or agitated to change the pattern and the disc 10 is composed of a light polarizing filter combined with divided thicknesses of mica. This disc 10 and/or the combined light analyzing disc 17' are relatively rotatable so that the colour of the patterns may be changed by altering the position of the disc 10 and/or the disc 17'. Colour tone control may be effected by adjustment of the disc 16.

It will be understood that the patterns produced by the pattern producing cell may be in black and white or may be in sombre hues or may be in brilliant colours depending upon the selection of the various parts of the cell. The production and control of colour and opacity may be effected by the use of mutually overlapping sheets or pieces of material including the loose pieces 18 and the discs through which the light is transmitted to produce the patterns. Among materials which may be used in the cell unit in the production of colour and opacity I may mention the following:

(1) All types of light polarizing sheet for example showing indigenous and/or imparted light polarizing properties. Material known under the registered trademark Polaroid is satisfactory.

(2) Refracting material such as mica.

(3) Stressed materials such as regenerated cellulose sheet possessing refractive or bi-refringent light binding properties such as sheet known under the registered trademark Cellophane or similar material for example in the form of adhesive strip or sheet.

In the cell shown and described in FIGURE 5 there is a light polarizing disc or filter 10 of light polarizing material combined with a refractive material such as mica through which light passes into the cell, secondly a light diffusing filter 11 of etched or milled glass or plastic, thirdly a light refracting rotational filter 16, then the loose pieces 18 of light polarizing material and then a final combined filter of light refracting material such as material known under the registered trademark Cellotape and a light analyzing polarizing filter also rotatably controlled through which the light passes out of the cell unit. Dimming or light pulsating effects may be obtained by introducing an extra rotatable filter of light polarizing material between the light source and the cell.

A sequence or arrangement of filters may be incorporated in a cell-unit in various different ways for example:

(1) The different filters may all be separate and relatively rotatable to one another, the loose light polarizing sheet elements being placed between two light polarizing filters for example between a polarizing filter and an analyzing filter.

(2) Certain of the filters of light polarizing material, which may be composite, sectionalized or uniform, may be sealed together and may be positioned in such a manner as to impart the most brilliant colour to the light as it leaves the cell. Two of these compound filters may be used in a single cell and the compound filters may be made relatively rotatable, the loose polarizing sheet elements being placed between the two filters.

(3) A similar arrangement to that under clause 2 above but the parts of one or other of the compound filters are independently rotatable thus giving a means of colour tone control.

(4) A similar arrangement to that under clause 2 but using fixed filters and relying solely on the random positioning of the overlapping loose pieces of polarizing sheet elements to change the pattern and colour.

(5) When a white or colourless background is required the light polarizing filter 10 may be withdrawn so that the loose polarizing sheet elements fulfil the intial light polarizing function creating a coloured structural pattern on a colourless ground. This sequence may also be reversed.

(6) When a dark or black background is desired any of the preceding arrangements can be used in conjunction with suitable light obstruction screens.

(7) Loose pieces of sheet material such as mica may be disposed between filters of polarizing sheet, the most brilliant patterns being obtained when these two filters have their polarizing axes crossed.

It will be understood that when a thin sheet of bi-refringent stressed material or the like is disposed between two sheets of polarizing material in the cell and at a suitable orientation with respect to the directions of polarization of the sheets of polarizing material that the stressed material will appear to be coloured. The reason for this is that when light falls on a sheet of bi-refringent material the light is broken up into two plane polarized beams with their vibration planes at right angles to one another. These beams of light pass through the sheet of material at different speeds and thus a phase difference is introduced between the vibrations of the two beams as they pass through the bi-refringement material. As the beam of light passes through the first sheet of polarizing material it is plane-polarized; on entering the bi-refringent material the beam is broken up into two components polarized at right angles to one another and, on leaving the bi-refringent material and entering the second sheet of polarizing material the two components are resolved into one plane-polarized beam again but now the phase difference has been introduced between the two parts of the beam and with a white light source brilliant colours emerge from the device. The extent of the phase difference introduced into the light beam depends on the difference between the two velocities in the bi-refringent material. The difference varies for the different wave-lengths of the spectrum and so the various wave-lengths will emerge with different phase differences. Therefore when one wave-length emerges with one phase difference it may be completely extinguished while another wave-length may emerge with another phase difference and will appear in full intensity. This means that white light will appear with certain wave-lengths cut out which is another way of saying that coloured light will appear.

In the present invention the pattern producing cell will make use of these properties of refracting or bi-refringent material to create colours and the random arrangement of the pieces may be used to create patterns so that by a suitable combination of the filters and of the pieces I may obtain a coloured pattern. To obtain changing patterns and changing colours I make the cell adjustable so that the filters and the pieces may be moved. I may therefore use movable light filters to change the colour of the patterns produced by the cell and to produce different colour changes in different parts of the patterns produced. To achieve these results the light filters may include removable or relatively movable polarizing screens and/or screens of bi-refringent, double refracting or dichroic materials, interference filters or the like, the essential feature being that adjustment of the aforesaid light filters effects changes in the colour and intensity of the patterns produced. The light filters produce varying effects dependent on the types of filter material being employed, their uniform character or natural formation or their manner of construction in depth, the sectionalizing and superpositioning of the component sections of each composite filter and the relative position of such composite filters and/or integral filters to one another.

Probably the most simple and effective arrangement is to use shaped or fragmented loose pieces of sheet filter material between two relatively movable sheet filters whereby the loose pieces may assume an infinite number of different random arrangements in overlapping deposition to produce the various patterns.

Figure 6:
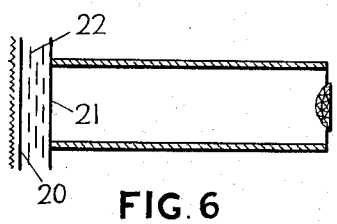
FIGURE 6 is a sectional diagrammatic view showing the positioning of polarizing material light filters on either side of the loose fragments in the pattern producing cell.

Various different possible arrangements for the construction of the cell are illustrated in the accompanying drawings as follows:

In FIGURE 6 two sheets 20, 21 of polarizing material forming light filters are disposed with their axes of polarization at 90° to one another and loose fragments 22 of mica are disposed between the filters. This will give a coloured pattern on a dark background.

Figure 7:
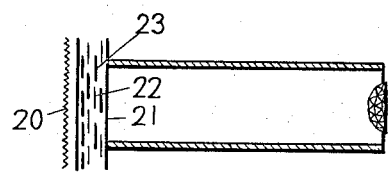
FIGURE 7 is a sectional diagrammatic view of the apparatus employing adjustable polarizing material light filters and colored fragments mixed with the loose fragments shown in FIGURE 6.

In FIGURE 7 two sheets 20, 21 of polarizing material forming light filters are relatively rotatable to form adjustable filters and mixed fragments 22 of mica and 23 of self-coloured material are disposed between the filters. This will give a controllable light or dark background with colour pattern contrast. If desired self-coloured fragments 23 may be used alone without the mica fragments.

Figure 8:
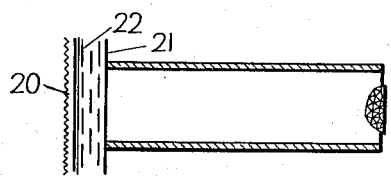
FIGURE 8 is a sectional diagrammatic view of the subject apparatus with a composite filter being employed.

In FIGURE 8 there are two relatively rotatable filters 20, 21 of polarizing material with fragments of mica 22 in between, the filter 20 being sectionalized in half or overall.

It will be understood that to give more complicated or different effects I may make changes suitably in the construction of the pattern producing cell to produce required results. The possible permutations embodying the aforesaid principles are too numerous to describe completely in this specification and the precise arrangements mentioned are examples only.

Figure 9:
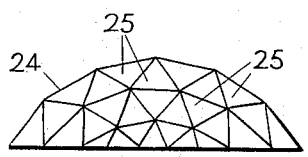
FIGURE 9 is a side view of a multi-vision lens having flat surfaces that can be used in the apparatus.
Figure 10:
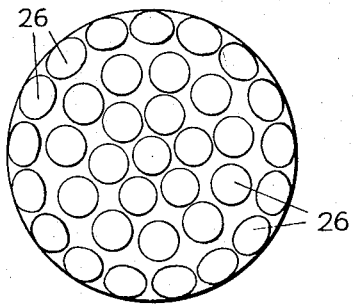
FIGURE 10 is a top view of a modification of the multi-vision lens showing the use of projections in the lens surface.
Figure 11:
FIGURE 11 is a cross-sectional view of a recessed multi-vision lens that may be used in the subject apparatus.

FIGURES 9, 10 and 11, respectively are views of different constructions of the multi-vision lens. In FIGURE 9 the lens 24 has flat facets 25 each substantially in the shape of an equilateral triangle. In FIGURE 10 the lens is castellated by the provision of projections 26 and in FIGURE 11 the lens has recesses 27 the underlying idea being to break up refract and bed the light rays, multiplying the image produced by the cell and the mirrors to provide rhythmic designs, the elements of which merge gracefully into one another.

In the above description I have referred to altering the patterns by rotation of the polarizing filters. It will be understood that changing patterns and colours may be obtained by tilting the filters or by altering the angle of incidence of light entering the apparatus or by removing and replacing filters.

It will be understood that various modifications are possible for example the mirrors forming the light passage in the tube need not extend for the full length of the tube. If desired the mirrors need not completely enclose the light passage, that is to say the mirrors need not encompass a full 360°. Further the mirrors may be adjustably mounted relatively to one another. In another possible arrangement a focussing lens or lens assembly may be interposed between the cell and the multi-vision lens. It is also possible to make the light passage from a solid rod of transparent material or from a suitable receptacle holding a liquid.

What I claim is:

1. An optical apparatus for producing ever changing designs comprising a tubular body adapted to provide a path for light rays, an inlet end of the body through which light rays may enter the body, an outlet end of the body through which light rays may leave the body, suitably arranged mirrors disposed within the tubular body in the manner of a kaleidoscope to form the light path, and an adjustably mounted pattern producing cell adjacent to the inlet end of the body, light correcting discs in the cell through which light rays may pass, loose pieces of material in random arrangement within the cell, means for rotating the cell continuously to alter the random disposition of the pieces and a multi-vision lens with an irregular surface adjacent to the outlet end of the body whereby ever changing designs giving a 3-dimensional effect and including partly superimposed elements may be produced.

2. An optical apparatus for producing ever changing designs comprising a body in the form of a hollow tube of uniform circular cross-section to provide a light path, an inlet end of the body through which light rays may enter the body, an outlet end of the body through which light rays may leave the body, a rotatably mounted pattern producing cell adjacent the inlet end of the body, light polarizing discs in the cell through which light rays may be passed, loose pieces of interleaving material in random arrangement within the cell arranged so that they can slide over one another as the cell is rotated, a multi-vision lens with an irregular surface adjacent to the outlet end of the body, and elongated mirrors arranged within the tube to form a light passage of triangular cross-section extending along the length of the body from the pattern producing cell to the multi-vision lens whereby designs giving a three-dimensional effect including partly superimposed elements may be produced.

3. An optical apparatus for producing ever changing designs comprising a body in the form of a hollow tube of uniform circular cross-section to provide a light path, an inlet end of the body through which light rays may enter the body, an outlet end of the body through which light rays may leave the body, a rotatably mounted pattern producing cell adjacent the inlet end of the body, light polarizing discs in the cell through which light rays may be passed, loose pieces of interleaving material in random arrangement within the cell arranged so they can slide over one another as the cell is rotated, a multi-vision lens with an irregular surface adjacent to the outlet end of the body, and mirrors arranged in the tube to form a light passage therein extending along the length of the body from the pattern producing cell to the multi-vision lens, the cross-section of the light passage being changed abruptly from one form to another between the cell and the lens whereby designs giving a three-dimensional effect including partly superimposed elements may be produced.

4. An optical apparatus for producing ever-changing designs comprising a pattern producing cell having spaced apart light transmitting walls, said cell capable of being rotatably adjusted, flat pieces of interleaving material disposed loosely within said cell and adapted to slide upon one another as the cell is rotated, a light source in visual alignment wtih one side of said cell, and a lens visually aligned with said cell on the opposite side thereof, said lens having a convex curved surface positioned to face said cell, individual facets on said curved lens surface disposed so that each facet acts as an individual lens on the curved surface giving a radial focal spread and a different focal length in relation to each of said flat pieces within said cell whereby light rays emanating from said source and passing through said cell and said pieces will produce complex overlapping images of said pieces.

References Cited in the file of this patent

UNITED STATES PATENTS

| | | |
|---|---|---|
| 314,586 | Leach | Mar. 31, 1885 |
| 839,379 | Gibboney et al. | Dec. 25, 1906 |
| 1,518,204 | Husted | Dec. 9, 1924 |
| 1,595,627 | Seymour | Aug. 10, 1926 |
| 1,758,589 | Wilfred | May 13, 1930 |
| 1,990,867 | Harvey | Feb. 12, 1935 |
| 2,423,371 | Carranza | July 1, 1947 |
| 2,484,116 | Papke | Oct. 11, 1949 |
| 2,493,238 | Eddy | Jan. 3, 1950 |
| 2,727,426 | Lopez | Dec. 20, 1955 |
| 2,757,570 | Molnar | Aug. 7, 1956 |
| 2,786,292 | Graves | Mar. 26, 1957 |
| 2,846,918 | Miles | Aug. 12, 1958 |

FOREIGN PATENTS

| | | |
|---|---|---|
| 1,331 | Great Britain | of 1875 |
| 505,407 | Great Britain | May 10, 1939 |